United States Patent Office 2,712,094
Patented June 28, 1955

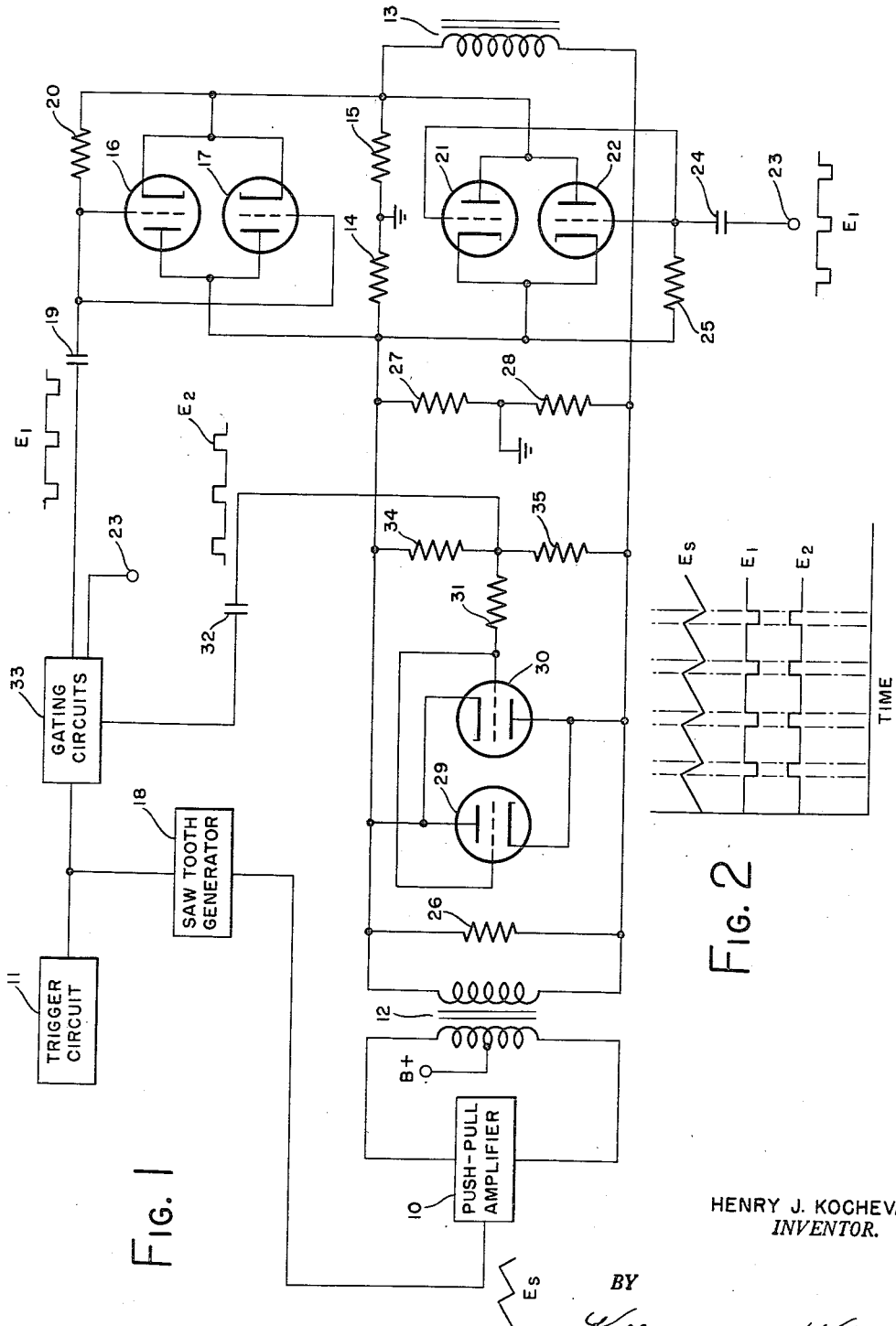

2,712,094

BIDIRECTIONAL TRANSFORMER COUPLED DEFLECTION CIRCUIT

Henry J. Kochevar, Baltimore, Md., assignor to Bendix Aviation Corporation, Towson, Md., a corporation of Delaware Application August 11, 1954, Serial No. 449,094

2 Claims. (Cl. 315—27)

This invention relates to circuits for producing a variable bidirectional sawtooth current for use in sweeping the beam of a cathode ray tube. The production of such currents is necessary where it is desired to magnetically deflect the beam of a cathode ray tube radially about a fixed point of origin to generate a sectorial P. P. I. type of presentation, and where the exciting voltage varies in magnitude and polarity.

In such a system it is difficult to maintain the point of of origin of the sweep constant as the exciting voltage changes polarity. Another undesirable characteristic of such system is the tendency at fast sweep speeds to develop transient oscillations at the beginning of the trace and retrace portions of the voltage curve.

It is an object of this invention to provide a deflection circuit for the magnetic deflection of the beam of a cathode ray tube in response to sweep voltage of changing polarity in which the point of origin remains constant.

It is another object of the invention to provide such a circuit in which the development of transient oscillations is effectively prevented.

These and other objects and advantages of the invention are realized in a circuit in which the deflection coil is transformer coupled to a push-pull output amplifier. A variable bi-polar sawtooth voltage is applied to drive the push-pull amplifier. Gated bidirectional trace clampers in parallel with each other are connected in series with the deflection coil and the transformer secondary. Bidirectional gated retrace clampers are connected in parallel directly across the transformer secondary. The gating voltages are synchronized with the sawtooth deflection voltage.

Referring now to the drawing:

Fig. 1 is a schematic diagram of a circuit embodying the invention; and

Fig. 2 is a graph of voltage waveforms employed in the operation of the circuit of Fig. 1 drawn to a common time base.

The circuit of Fig. 1 comprises a push-pull amplifier 10 to which is applied from the generator 18 a sawtooth voltage waveform $E_s$ shown in Fig. 2. The output of the amplifier 10 is applied to the primary of a transformer 12 which is of a current step-up type, preferably employing a "pie" wound primary coil and a ferrite core.

Connected in series with the secondary winding of the transformer 12 is a deflection coil 13 for the cathode ray tube, which is not shown. Also serially connected between the secondary of transformer 12 and deflection coil 13 are a pair of resistors 14 and 15 having their junction point grounded. A pair of triodes 16 and 17 are connected in parallel across the resistors 14, 15, their cathodes connected to the junction of resistor 15 and deflection coil 13 and their plates to the junction of resistor 14 and the secondary of transformer 12. The grids of these tubes are connected to gating circuit 33 by way of a coupling condenser 19 and the grids of both tubes are connected to the cathode by way of a resistor 20.

Likewise connected in parallel across the resistors 14, 15 are a pair of tubes 21 and 22, the plate and cathode connections being reversed with respect to those of tubes 16, 17. The grids are connected to an input terminal 23 via a condenser 24 and the grids of tubes 21 and 22 are returned to the cathode connection by way of resistor 25. Terminal 23 is connected to one terminal of gating circuit 33.

A resistor 26 is connected across the secondary of transformer 12 as is also a pair of serially connected resistors 27, 28 having their junction point grounded. There is also connected across the secondary a pair of parallel connected tubes 29 and 30, each having its cathode connected to the anode of the other. The grids of these tubes are connected through a resistor 31 and condenser 32 to a second output terminal of gating circuit 33. The junction of resistor 31 and condenser 32 is joined by a pair of resistors 34 and 35 of equal value to opposite terminals of the secondary of transformer 12.

In the operation of the circuit the voltage waveform $E_s$ applied to the amplifier 10, the gating voltage $E_1$ applied to the grids of tubes 16, 17, 21 and 22 and the gating voltage $E_2$ applied to the grids of tubes 29 and 30 are synchronized in the manner shown in the graph of Fig. 2 by means of a trigger circuit 11. The voltage $E_s$ may vary from a maximum positive excursion to a maximum negative excursion through intermediate values. For one polarity of the voltage $E_s$ a clockwise deflection current will flow from the secondary of transformer 12 through the clamping tubes 16, 17, through the coil 13 and back to the transformer. When the sawtooth voltage changes to the other polarity a counter-clockwise deflection current will flow from the secondary of transformer 12, through the deflection coil 13, through the clamping tubes 21 and 22 and back to the transformer.

The clamping tubes 16, 17, 21 and 22 will conduct only during the trace time, or the longer leg of the sawtooth voltage $E_{s1}$ being cut-off during the shorter leg or retrace time of the waveform. During the retrace time these tubes are cut-off by the negative going portions of the gating voltage waveform $E_1$ which is capacity coupled to their grids. The voltage applied to the grids of tubes 16, 17 has a return path through resistors 20 and 15, while that applied to the grids of tubes 21, 22 has a return path through resistors 25 and 14. During trace time the grids of the clamping tubes 16, 17, 21 and 22 are driven slightly positive by the positive going portions of the voltage $E_1$. Under this condition the plate resistance of the clamping tubes is low and offers a minimum loss to the deflection current. Two tubes rather than one are employed in each clamper in order to make this resistance low.

The retrace clamping tubes 29 and 30 connected in parallel across the secondary of transformer 12 have the function of dissipating during retrace time, the energy stored in the transformer and thus improving the clamping of the deflection current. They also dampen the oscillation set up at the start of the retrace time. Tube 29 will conduct a current flowing in a clockwise direction while tube 30 will conduct one flowing in a counter-clockwise direction. The gating voltage $E_2$ applied to the grids from the gating circuits 33 will cut off the tubes during trace time by virtue of the negative going portion of the waveform which occurs throughout this period. The return path for the voltage $E_2$ with respect to tube 29 is by way of resistors 35 and 28 when that tube is cut off thereby. The return path with respect to tube 30 is through resistors 34 and 27. This arrangement forms a balanced circuit and prevents the gate voltage from feeding into the deflection circuit. During retrace time the positive portion of gate voltage $E_2$ drives the grids of both clamping tubes 29 and 30 slightly positive. Grid current flows in both tubes and is limited by resistor 31.

Under this condition the plate resistance of these tubes is placed at a low value and a low impedance is, accordingly, presented directly across the secondary of transformer 12. The energy stored in the transformer will dissipate itself through these tubes during this period.

Resistance 26 connected directly across the transformer secondary dampens the transient oscillations which occur at the start of trace time. For applications where the duty cycle is large the clamping tubes 29 and 30 can be eliminated. If this is done the resistor 26 should be replaced by a grounded center tapped resistor. Resistors 14 and 15 have high values and therefore do not effect the clamping of the sawtooth current.

It is preferable to utilize a deflection coil having a very low inductance since such a coil has a low distributed capacity and consequently has less of a tendency to set up local oscillations under fast sweep speeds. Such oscillations will produce undesired variations in fast sweeps. Since low inductance coils require high peak currents in order to provide the required number of ampere turns, a current step-up transformer should be used.

The circuit described above insures the clamping of sawtooth currents of either polarity and of varying polarity, providing a smooth transition when a reversal of polarity occurs, with a resultant freedom from flicker in the display. This smooth transition is insured by the bidirectional clampers which always provide a low impedance conducting path in both directions for the sawtooth current during trace time. While the waveform Es is shown with no interval between the trace and retrace portions, the invention is also applicable to systems in which such an interval occurs.

What is claimed is:

1. Means for deflecting the beam of a cathode ray tube in response to a sawtooth voltage varaible in amplitude and polarity comprising: a push-pull amplifier, means applying said sawtooth voltage to the input of said amplifier, a deflection coil, means applying the output of said amplifier to said deflection coil, said means comprising a transformer having its primary connected to the output of said amplifier and its secondary connected in series with said coil, a high resistance means connected in said series connection between said secondary and said coil, bidirectionally conductive clamping means connected in parallel with said high resistance means, means rendering said clamping means conductive during the trace portion of said sawtooth voltage and non-conductive during the retrace portion of said sawtooth voltage, bidirectionally conductive clamping means connected across the terminals of the secondary of said transformer, and means rendering the last named clamping means conductive during the retrace portion of said sawtooth voltage and non-conductive during the trace portion of said sawtooth voltage.

2. Means for deflecting the beam of a cathode ray tube in response to a sawtooth voltage variable in amplitude and polarity comprising: a push-pull amplifier, means applying said sawtooth voltage to the input of said amplifier, a deflection coil, means applying the output of said amplifier to said deflection coil, the last named means comprising a transformer having its primary connected to the output of said amplifier and its secondary connected in series with said coil, a high resistance means connected in said series connecting between said secondary and said coil, a first bidirectionally conductive clampnig means connected in parallel with said high resistance means, a second clamping means connected across the terminals of the said secondary, said second clamping means being bidirectionally conductive, voltage responsive control means individual to said first and second clamping means and effective to render the same conductive or non-conductive, means generating a pair of gating voltages in synchronism with said sawtooth voltage, and means applying a respective one of said voltages to the control means of said first clamping means and to the control means of said second clamping means, the one of said voltages applied to said first clamping means having a configuration operative to render said first clamping means conductive during the trace time and non-conductive during the retrace time of said sawtooth voltage and the one of said voltages applied to said second clamping means having a configuration operative to render said second clamping means non-conductive during the trace time and conductive during the retrace time of said sawtooth voltage.

References Cited in the file of this patent
UNITED STATES PATENTS
2,629,006    Oliver _____ Feb. 17, 1953